United States Patent
Sugiyama

[11] Patent Number: 6,042,062
[45] Date of Patent: Mar. 28, 2000

[54] BRACKET LOCKING CLAMP

[75] Inventor: Masashi Sugiyama, Yokkaichi, Japan

[73] Assignee: Sumitomo Wiring Systems, Ltd., Japan

[21] Appl. No.: 09/094,838

[22] Filed: Jun. 15, 1998

[30] Foreign Application Priority Data

Jun. 19, 1997 [JP] Japan ..................................... 9-163067

[51] Int. Cl.[7] ................................................. F16L 3/08
[52] U.S. Cl. ........................... 248/65; 248/73; 174/72 A
[58] Field of Search ................................ 248/65, 72, 73, 248/221.11, 222.11, 222.13, 224.8, 225.21, 60, 63, 58; 174/72 A, 135; 24/664, 665

[56] References Cited

U.S. PATENT DOCUMENTS

| | | | |
|---|---|---|---|
| 4,871,134 | 10/1989 | Oikawa | 248/65 |
| 4,953,801 | 9/1990 | Oikawa | 248/65 |
| 5,106,040 | 4/1992 | Cafmeyer et al. | 248/73 |
| 5,375,798 | 12/1994 | Hungerford, Jr. | 248/58 |
| 5,720,586 | 2/1998 | Kawaguchi | 411/508 |
| 5,760,338 | 6/1998 | Suzuki | 174/72 A |

FOREIGN PATENT DOCUMENTS 62-27209 of 1987 Japan .
2-34887 of 1990 Japan .

*Primary Examiner*—Anita M. King
*Attorney, Agent, or Firm*—Anthony J. Casella; Gerald E. Hespos

[57] ABSTRACT

A clamp is provided and is commonly usable for brackets having different thicknesses. The clamp 10 includes a base plate 11 to be fixed to an automotive wiring harness by taping and a box portion 12 integrally formed with the base plate 11, and an arm 13 having a lock claw 13a at its leading end projects from a rear part of the lower inner surface of the box portion 12 into a hollow portion 14 of the box portion 12. A bracket 4 projecting from a vehicle body is inserted into the hollow portion 14 of the box portion 12 and the lock claw 13a is inserted into a hole 4c formed in the bracket 4 to lock the bracket 4 and the clamp 10. Thinned and elastically deformed thickness take-up portions 15 are formed at the opposite side walls of the box portion 12. In the case that the bracket 4 being inserted into the hollow portion 14 of the box portion 12 is thick, the thickness take-up portions 15 extend to enable the insertion of the lock claw 13a into the hole 4c of the bracket 4.

3 Claims, 4 Drawing Sheets

BRACKET LOCKING CLAMP

BACKGROUND OF THE INVENTION

1. Field of the Invention

The present invention relates to a bracket locking clamp for mounting a wiring harness to be arranged, for example, in an automotive vehicle on a bracket projecting from a vehicle body and is design particularly to use such a clamp commonly regardless of the thickness of brackets.

2. Description of the Prior Art

A wiring harness is fixed to a vehicle body by a prior art bracket locking clamp. A known bracket locking clamp is illustrated in FIGS. 4–6 and is identified by the numeral 1. The prior art bracket locking clamp 1 is fixed to a wiring harness W/H by tape 2 and is locked with an L-shaped bracket 4 projecting from the vehicle body 3.

The prior art clamp 1 includes a base plate 1a the opposite ends of which are fixed to the wiring harness W/H by the tape 2. The clamp 1 further includes a box portion 1b integrally formed with the base plate 1a and having open front and rear surfaces. An arm 1c with a lock claw 1d projects from the lower inner surface of the box portion 1b into a hollow portion 1f of the box portion 1b, and guide ribs 1g are provided on the lower inner surface, as shown most clearly in FIGS. 5 and 6. The bracket 4 includes a vertical portion 4a having its bottom end secured to the vehicle body 3 and a horizontal portion 4b projecting from the leading end of the vertical portion 4a. The horizontal portion 4b is in the form of a frame as shown in FIG. 5 and is formed with a lock hole 4c in its upper surface.

The clamp 1 is locked with the bracket 4 by inserting the horizontal portion 4b of the bracket 4 into the box portion 1b of the clamp 1 through its open front surface. The horizontal portion 4b of the bracket 4 is guided into the box portion 1b of the clamp 1 by the guide ribs 1g. The lock claw 1d at the leading end of the arm 1c of the clamp 1 then is inserted into the lock hole 4c of the bracket 4 from above.

To lock the clamp 1 and the bracket 4 as explained above, the height H of the hollow portion 1f of the box portion 1b of the clamp 1 is set according to thickness t of the bracket 4. Thus the bracket 4 cannot easily be fitted and locked if the height H of the hollow portion 1f is smaller than a suitable set value. Conversely a locking force is weak if the height H is larger than the suitable set value. However, the thickness t of the bracket 4 is set based on the size (weight) of the wiring harness W/H or other factors to ensure a satisfactory holding strength. As a result, the thickness t will vary from one wiring harness to another. Thus, it is necessary to change the height H of the hollow portion 1f of the box portion 1b according to the thickness of the bracket 4. The use of brackets of a specified thickness constantly requires a corresponding kind of clamp. This disadvantageously leads to the preparation of a multitude of kinds of clamps.

In view of the above, an object of the present invention is to provide a clamp which can be used commonly for brackets having different thicknesses.

SUMMARY OF THE INVENTION

According to the invention, there is provided a bracket locking clamp, comprising a base plate to be fixed to a wiring harness, a box portion integrally or unitarily formed with the base plate, and a locking means. The clamp is adapted to lock a bracket by inserting the bracket into a hollow portion of the box portion and locking it with the lock means. One or more thickness take-up or adapting portions are formed in one or more side walls of the box portion. The one or more thickness take-up portions are deformable when a force acts on a limiting wall of the box portion thereby increasing the height of the box portion.

Accordingly, the thickness take-up portions can extend to enable the insertion of the bracket into the hollow portion in the case that the bracket to be inserted into the hollow portion of the box portion is thick or thicker than the height of the hollow portion with the thickness take-up portions in the undeflected or not elongated state.

According to a preferred embodiment of the invention, the thickness take-up portions are formed by thinned and/or elastically deformed portions of the one or more side walls.

Thus, the thickness take-up portions can elongate or deform easily to allow for an easy or smooth insertion of the bracket into the hollow portion.

Preferably, the thickness take-up portions bulge in a direction at an angle different from 0° or 180°, preferably substantially normal to the corresponding side walls. Accordingly, the thickness take-up portions can be manufactured.

Most preferably, the thickness take-up portions are bulge in a direction substantially away from the hollow portion of the box portion.

According to a further preferred embodiment, there is provided a bracket locking clamp, comprising a base plate to be fixed to an automotive wiring harness by taping, a box portion integrally formed with the base plate. An arm with a lock claw at the leading end projects from the inner surface of the box portion into a hollow portion of the box portion. The clamp is adapted to lock a bracket projecting from a vehicle body by inserting the bracket into the hollow portion of the box portion and inserting the lock claw into a hole formed in the bracket. Thinned and elastically deformed thickness take-up portions are formed in opposite side walls of the box portion for extending to enable the insertion of the lock claw into the hole of the bracket in the case that the bracket being inserted into the hollow portion of the box portion is thick.

If the thinned and elastically deformed thickness take-up portions are formed in the opposite side walls of the box portion as described above, they extend when the bracket is inserted into the hollow portion of the box portion, thereby enabling the lock claw to be inserted and locked in the hole of the bracket. In the case of a thin bracket, the lock claw is locked in the hole of the bracket without the thickness take-up portion extending. Although the thickness take-up portions extend when the bracket is pushed into the hollow portion, they are held elastically deformed when no external force acts.

Preferably, the locking means comprises an arm with a lock claw at the leading end which projects at least partially from the inner surface of the box portion into a hollow portion of the box portion. The bracket is locked by inserting the lock claw into a hole formed in the bracket.

Further preferably, the box portion comprises at least one bevelled portion, preferably at a front portion thereof with respect to an insertion direction of the bracket into the hollow portion of the box portion. Accordingly, the bracket can be inserted smoothly even if its thickness is higher or larger than the height of the hollow portion, since the bevelled portions allow for a smooth displacement of the limiting wall of the box portion thus deforming or elongating the thickness take-up portion(s).

Still further preferably, the bevelled portion is provided on the limiting wall of the box portion.

Most preferably, the box portion comprises one or more guide grooves for guiding one or more walls, preferably side walls of the bracket upon its insertion.

Accordingly, the wedging of the bracket in the hollow portion can be prevented effectively, thus increasing the handling or manipulation of the bracket locking clamp.

These and other objects, features and advantages of the present invention will become more apparent upon a reading of the following detailed description and accompanying drawings.

DETAILED DESCRIPTION OF THE PREFERRED EMBODIMENT

Figure 1A:
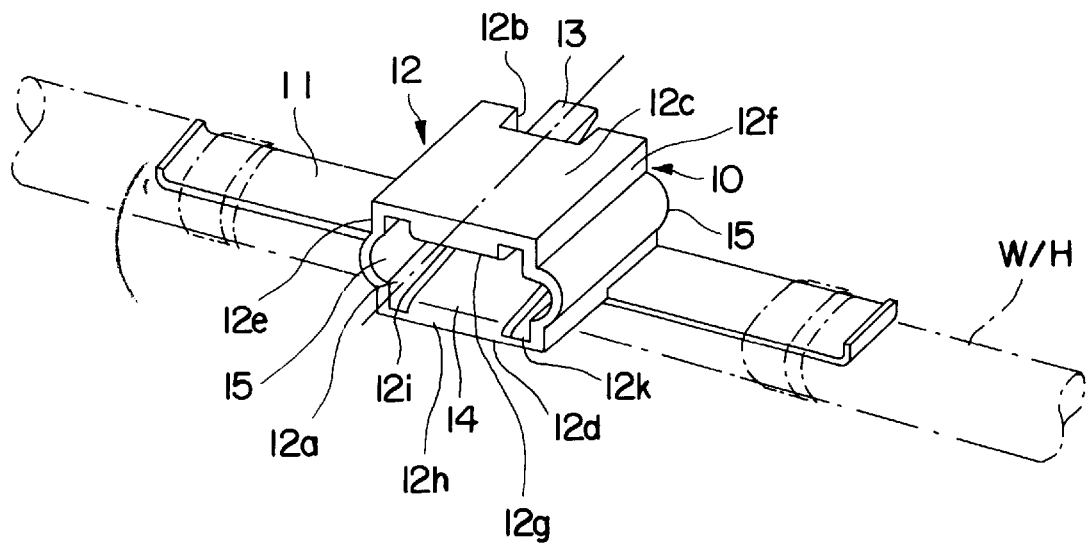
FIG. 1(A) is a perspective view of a clamp according to one embodiment of the invention and FIG. 1(B) is a section along B—B of FIG. 1(A).
Figure 1B:
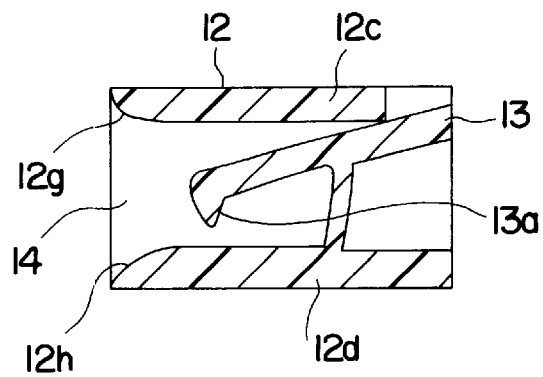
Figure 4:
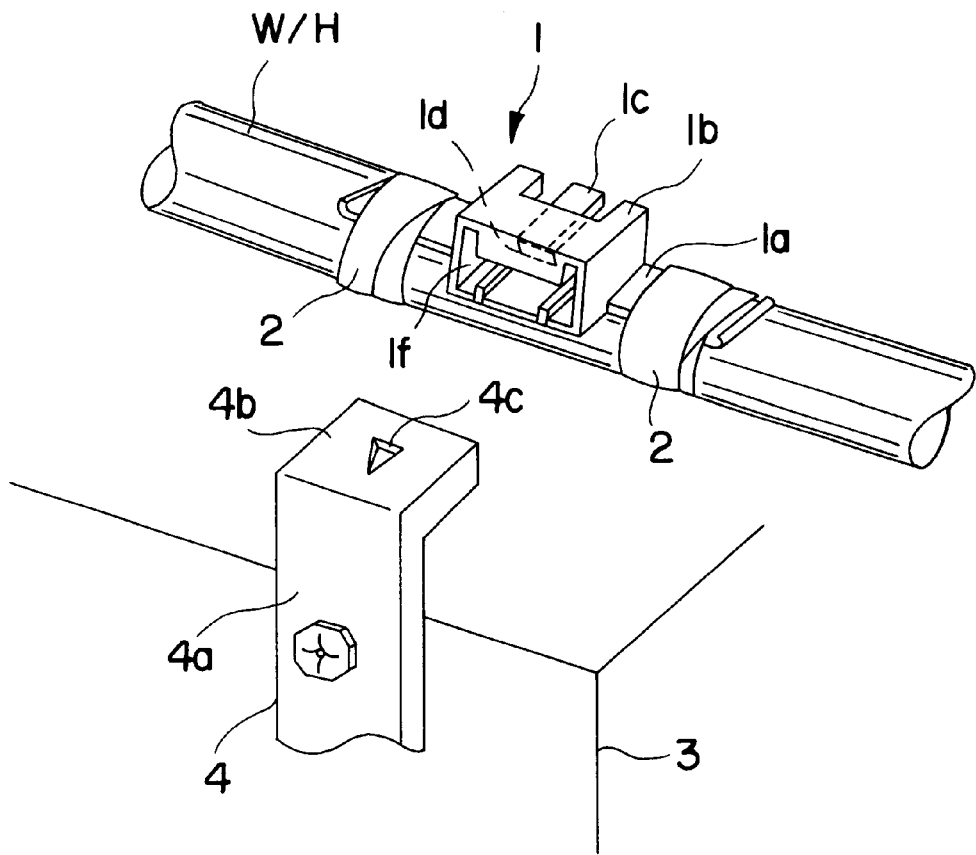
FIG. 4 is a perspective view showing a relationship between a bracket and a prior art clamp.
Figure 5:
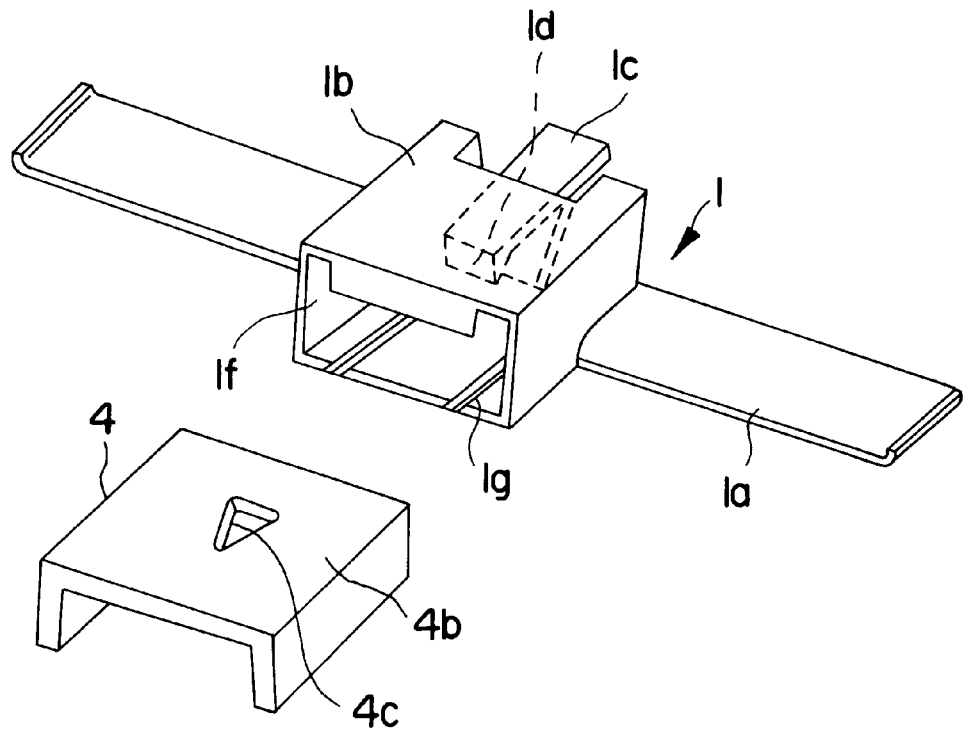
FIG. 5 is a perspective view of the prior art clamp.
Figure 6:
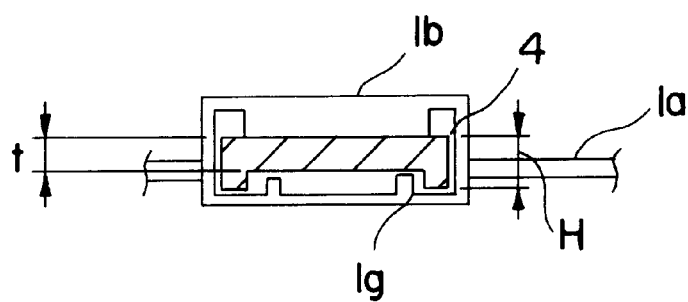
FIG. 6 is a schematic diagram showing a locked state of the prior art clamp with the bracket.

A clamp in accordance with the subject invention is shown in FIGS. 1(A) and 1(B) and is identified by the numeral 10. The bracket 4, which projects from the vehicle body and is to be locked with the clamp 10, has the same configuration as the one according to prior art, as shown in FIGS. 4 and 5. Specifically, the bracket 4 includes a vertical portion 4a having its bottom end secured to the vehicle body and a horizontal portion 4b projecting from the leading end of the vertical portion 4a. The horizontal portion 4b is comprised of left, right and upper walls, 4b-1, 4b-2 and 4b-3 respectively. A hole or recess 4c is formed in the upper wall 4b-3.

The clamp 10 is made, for example, of resin and includes a base plate 11 to be fixed to a wiring harness by taping, clips or similar fixing means. The clamp 10 includes a box portion 12 integrally or unitarily formed with the base plate 11. An arm 13, having a downward facing lock claw 13a at its leading end, substantially projects from a rear part of the lower inner surface of the box portion 12 into a hollow portion 14 of the box portion 12.

The box portion 12 has openings 12a, 12b in its front and rear surfaces, respectively. Upper and lower walls 12c, 12d of the box portion 12 are thickened so as to have an increased rigidity, whereas lateral or left and right side walls 12e, 12f thereof are formed in their middle positions with height or thickness take-up or adapting portions 15 which are thinned and elastically deformed preferably outwardly. The thickness take-up portions 15 are elastically deformed outwardly as shown in FIG. 1 during the molding of the clamp 10, and are formed such that the height thereof is smaller than that of the box portion 12. By being formed as above, the thickness take-up portions 15 do not extend or elastically deform outwardly unless a specified or predetermined or predeterminable external force acts thereon. The thickness take-up portions 15 are portions of the lateral or side walls 12e, 12f, which are deformed or bulge in a direction at an angle different from 0° or 180° with respect to a plane of the lateral walls 12e, 12f and preferably are thinned to have an increased flexibility or elasticity. Accordingly, the thickness take-up portions 15 can easily elongate or straighten or flatten so as to increase the longitudinal extension or height H of the lateral walls 12e, 12f as will be described later in more detail.

Figure 2:
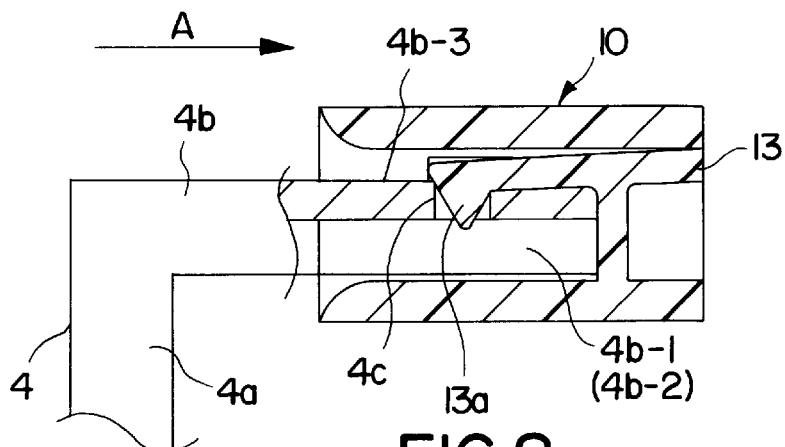
FIG. 2 is a section showing a locked state of the clamp with a bracket.

Further, at the front ends of the upper and lower walls 12c, 12d forming the upper and lower edges of the front opening 12a of the box portion 12 are formed bevelled portions 12g, 12h to facilitate the insertion of a bracket 4 (FIG. 2) projecting e.g. from a vehicle body.

The lower wall 12d is formed with guide grooves 12i, 12k at opposite sides thereof for slidably guiding left and right walls 4b-1, 4b-2 of the horizontal portion 4b of the bracket 4. The upper wall 4b-3 of the horizontal portion 4b of the bracket 4 with the hole 4c is inserted or insertable between the lower wall 12d and the upper wall 12c. A spacing between the upper and lower walls 12c and 12d (i.e. height H of the hollow portion 14 of the box portion 12) needs at least to correspond to thickness t of the upper wall 4b-3 of the bracket 4.

Figures 3A, 3B:
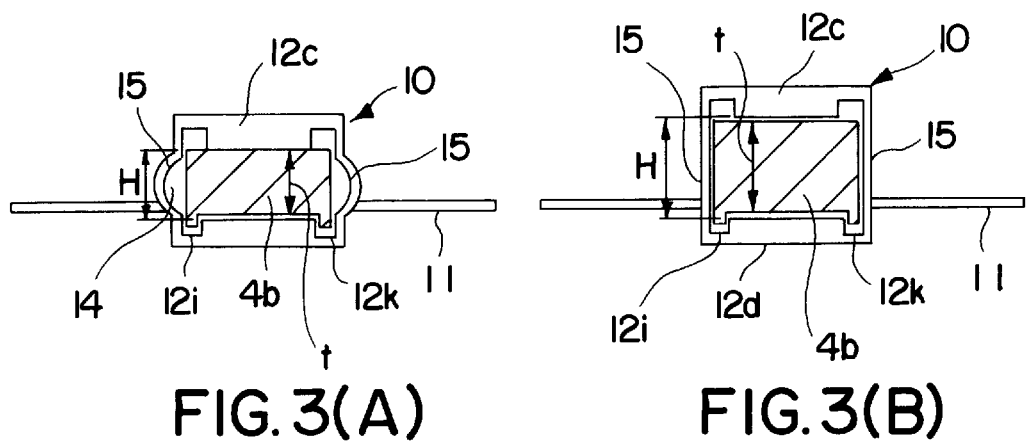
FIGS. 3(A) and 3(B) are schematic diagrams showing a relationship between the thickness of the bracket and the clamp.

In the case of a thin (1.2 mm) bracket 4 as shown in FIG. 3(A), the height H of the hollow portion 14 of the box portion 12 of the clamp 10 substantially corresponds to the thickness t with the thickness take-up portions 15 of the left and right side walls of the box portion 12 elastically deformed outwardly. The horizontal portion 4b of the bracket 4 is inserted into the box portion 12 without extending or straightening the thickness take-up portions 15, and the lock claw 13a inside the box portion 12 can be smoothly inserted and locked in the hole 4c. In this state, the lock claw 13a is not disengaged from the hole 4c.

In the case of the thick (2.6 mm) bracket 4 as shown in FIG. 3(B), the horizontal portion 4b is forcibly inserted into the hollow portion 14 in an insertion direction A since the height H of the hollow portion 14 is smaller than the thickness t. During this time, the horizontal portion 4b can be inserted easily into the hollow portion 14 since the bevelled portions 12g, 12h are formed at the upper and lower edges of the opening 12a.

When the horizontal portion 4b is pushed into the hollow portion 14, the thickness take-up portions 15 at the opposite sides of the box portion 12 extend, permitting the insertion of the horizontal portion 4b so that the lock claw 13a can be locked in the hole 4c. In other words, in case the height H of the hollow portion 14 is substantially less than the thickness t of the bracket 4 to be inserted, the thickness take-up or adapting portions 15 elongate, or their bulges are straightened, thus increasing the height H to at least the thickness t of the bracket 4, thereby allowing the hollow portion 14 to accommodate the bracket 4 at least partially in the hollow portion 14.

As is clear from the above description, in the case of the thick bracket, the thickness take-up portions of the clamp extend to enable the locking of the clamp with the bracket according to the invention. Accordingly, even in the case of thick brackets, it is not necessary to provide separate corresponding clamps.

The clamp can be used commonly for thin and thick brackets and it is not necessary to prepare a multitude of kinds of clamps. Thus, the number of parts can be reduced. Further, since it is not necessary to distinguish kinds of clamps to be mounted on a wiring harness, the wiring harness can be assembled more easily.

What is claimed is:

1. A bracket locking clamp, comprising a base plate to be fixed to a wiring harness, a box portion integrally formed with the base plate, the box portion comprising opposed spaced apart upper and lower walls and opposed spaced apart side walls extending between the upper and lower walls, such that a hollow portion is defined between the upper, lower and side walls, and a locking means, the clamp being configured to lock a bracket by inserting the bracket into the hollow portion of the box portion and locking the bracket with the locking means, wherein a thickness take-up portion is formed in each said side wall of the box portion, the thickness take-up portions each being a thin elastically deformable portion of the respective side wall that defines an arcuate bulge projecting away from the opposed side wall, each said arcuate bulge extending through an arc of less than 180°, such that a force on at least one of the upper and lower walls of the box portion at least partially straightens said arcuate bulges thereby increasing a distance between the upper and lower walls of the box portion, and wherein the upper and lower walls each include a beveled edge leading into said hollow portion for facilitating insertion of the bracket and generating forces for straightening said arcuate bulges.

2. A bracket locking clamp according to claim 1, wherein each of said side walls includes a substantially planar upper side panel extending from the respective bulge to the upper wall and a substantially planar lower side panel extending from the respective bulge to the lower wall, the upper and lower side panels of each said side wall lying in a common plane.

3. A bracket locking clamp according to claim 2, wherein each said arcuate bulge defines a portion of a cylinder.

* * * * *